United States Patent [19]

Mergenthaler et al.

[11] 4,070,648
[45] Jan. 24, 1978

[54] COMPUTER TO COMPUTER COMMUNICATION SYSTEM

[75] Inventors: Barry M. Mergenthaler; Wesley D. Dickover, both of Cambridge, Ohio

[73] Assignee: NCR Corporation, Dayton, Ohio

[21] Appl. No.: 697,796

[22] Filed: June 18, 1976

[51] Int. Cl.² .................. G08C 25/02; G06F 11/08
[52] U.S. Cl. ............... 340/146.1 BE; 340/146.1 BA; 235/306
[58] Field of Search ............ 340/146.1 BA, 146.1 BE; 364/306, 200, 900

[56] References Cited

U.S. PATENT DOCUMENTS

| | | | |
|---|---|---|---|
| 2,512,038 | 6/1950 | Potts | 235/153 AH |
| 3,427,585 | 2/1969 | Milford | 340/146.1 BA |
| 3,453,592 | 7/1969 | Ishii et al. | 340/146.1 BA |
| 3,523,279 | 8/1970 | Briley et al. | 340/146.1 BA |
| 3,624,603 | 11/1971 | Delcomyn | 340/146.1 BA |
| 3,934,131 | 1/1976 | Perschy | 340/146.1 BA |
| 3,934,224 | 1/1976 | Dulaney et al. | 340/146.1 BA |

*Primary Examiner*—Charles E. Atkinson
*Attorney, Agent, or Firm*—J. I. Cavender; Wilbert Hawk, Jr.; Jeffrey P. Morris

[57] ABSTRACT

A computer to computer data communication system for minimizing software protocol is disclosed wherein transmitted errors in data transmitted from one computer to another are detected when they occur by means of a bit-by-bit data echo transmission technique. True and inverted or complementary data are transmitted simultaneously serially over twisted pair lines for comparison, bit-by-bit by comparing each transmitted bit to the corresponding inverted bit to derive an error signal indicative of the condition of like polarity of the compared bits. If the compared bits are of like polarity, an error signal is generated to enable correction of the transmission error on a word by word basis, while inhibiting processing of the uncorrected data. Concurrently, received data is returned to the transmitting processor over a return data line for a like comparison. When an error condition exists, the returned data is inverted, forcing an error condition and inhibiting further transmission for the remainder of the transfer cycle. Thus, bit-by-bit detection, word-by-word correction and a variable block length capability in a double data transfer environment are accomplished, with both data processing and transmission inhibited until data errors are corrected.

16 Claims, 4 Drawing Figures

COMPUTER TO COMPUTER COMMUNICATION SYSTEM

BACKGROUND OF THE INVENTION

1. Field of the Invention

The present invention relates generally to processor to processor communications of digital data over a plurality of data lines, and more particularly to the provision of a novel technique for bit-by-bit error detection and correction of transmitted digital errors while reducing software protocol, minimizing transmitter-receiver hardware and relaying any detected error back to the transmitting processor upon its occurrence for correction, and the inhibiting of further data transmission until such detected error is corrected.

2. Description of the Prior Art

With the increasing use of telecommunication techniques for transmission of data in multiprocessor systems, and to and from remote terminals, an ever increasing amount of data must be transmitted from one data processor to another with suitable error detecting and correcting capability provided for detecting and correcting data errors "on the fly" occurring in transmission in a full duplex environment.

One such full duplex system of the prior art having a serial bit-by-bit protocol is referred to by IBM as synchronous data link control (SDLC), and is utilized widely as a teleprocessing procedure in distributed data processing systems. Error correction in an SDLC system is on a formatted basis with a variable number of data bytes per block of data, resulting in a variable block length and in a delayed error correction, as an entire byte or data word must be transmitted before an error can be detected. In the present invention, errors are detected bit-by-bit and corrected word-by-word in the bit stream, not ten to fifteen bits downstream, as in some prior art systems, or after transmission of an entire data block.

U.S. Pat. No. 3,912,872 describes a multiplexing technique for using each data bit transmitted for both message and address information. Other error correction methods of the prior art wherein error detection and correction are accomplished on other than a bit-by-bit basis are U.S. Pat. Nos. 3,680,053; 3,754,217 and 3,378,820.

SUMMARY OF THE INVENTION

A bit level communication system and method are disclosed for transferring data between two or more data processors while providing for substantially instantaneous error detection and correction by transmitting true (non-inverted) data and complementary (inverted) data serially over wire lines for comparison, then comparing each transmitted bit to the same bit as returned over a return data line. A like polarity of the compared data bits indicates error while an unlike polarity indicates correct data transmission. Novel error detection and correction circuitry detects any errors in transmission, inhibits data interrupts and inverts the remaining data bits in a transmitted message to force an error condition in the transmitter logic by returning inverted data for comparison with delayed transmitted data on a bit-by-bit basis until the error is corrected by retransmission or by software routine. This technique incorporates receiver parity generation and checking, detection by the receiver of either extra bits or missing bits in a pattern relative to time, bit-by-bit error detection with a single-bit delay of transmitted data and comparison with return data from the receiver, bit-by-bit detection with a double data transfer, and the creation of a forced error condition, once an error is detected, for the remainder of the transfer cycle.

It is therefore an object of the present invention to provide an improved full duplex system and method for transferring data between two or more data processors.

It is another object of the present invention to provide an improved error detection means and method for a data communication system.

It is another object of the present invention to provide a bit level data communication means and method between two or more computers.

It is yet another object of the present invention to provide a simplified hardware configuration while reducing the amount of software protocol needed to provide error free data transmission in a multiprocessor environment.

The foregoing and other features and advantages of the invention will be apparent from the following detailed description of a preferred embodiment of the invention together with the accompanying drawings wherein.

DESCRIPTION OF THE PREFERRED EMBODIMENT

Figure 1:
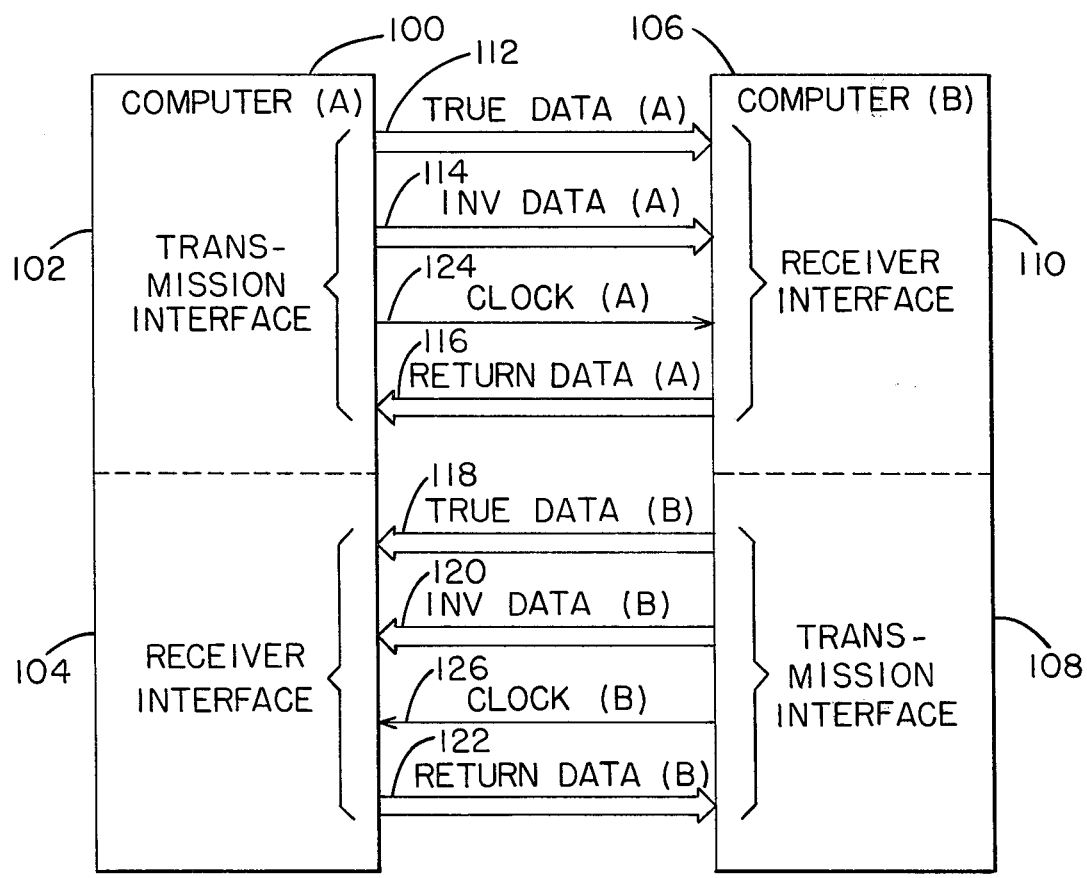
FIG. 1 is a simplified block diagram of a computer-to-computer communication system which embodies the present invention.

Referring now to FIG. 1, a simplified block diagram of a full duplex interprocessor communication data transfer in accordance with the present invention is illustrated. A first computer 100, computer (A), by means of its internal processor-to-processor transmitter/receiver logic 102 and 104 respectively couples data serially to a second computer 106, computer (B), having like internal processor-to-processor transmitter/receiver logic 108 and 110 respectively. For exemplary purpose, the data transmitted may be serial bit-by-bit in a binary synchronous mode, with provisions for full duplex operation. Thus, communication may occur simultaneously from the transmission interface 102 of computer A and fro the transmission interface 108 of computer B, with the transmission speed being dependent upon the length of the interprocessor cables 112, 114, 116, 118, 120 and 122, which may preferably comprise twisted pair lines. While the technique of the present invention is not limited to any particular data transmission environment, a typical implementation would utilize computer A as a primary computer and computer B as a back-up processor in a retail system requiring a continuous online processing capability. The primary processor A would periodically update the back-up processor B and, in the event of a primary processor failure, the back-up processor B would take over the primary processing function. In a supermarket environment, the primary processor would be coupled to the point of sale (POS) terminals while the back-up processor, being a separate entity, would perform back office functions such as payroll and inventory updating; however, the processor-to-processor link is always maintained.

The transmission interface 102 receives a 16-bit parallel data character internally from the I/O interface portion 102 of computer A as will be described in greater detail with reference to FIGS. 3 and 4, formats the 16-bit data character into a message and transmits the message serially bit-by-bit to the receiver interface 110 of computer B. True data (A) line 112 carries the serial data message to the receiver interface 110 of computer B, inverted data (A) line 114 carries the complement of the data message to the receiver interface 110 of computer B wherein the receiver 110 internally compares each bit of complementary data to the corresponding bit of noninverted data for the detection of transmission error. Clock (A) line 124 from computer A is a twisted pair cable carrying the data clock from the transmitter portion 102 of computer A to clock the data into the receiver portion 110 of computer B. The return data (A) line 116 is utilized by the receiver interface at receiving portion 110 to retransmit the data message as received by computer B back to the transmission interface of computer A wherein each bit of returned data is compared to the data as transmitted but one bit delayed as a means of checking for transmission error. Thus, the data transmission from the transmission interface 102 of computer A to the receiver interface 110 of computer B forms a half duplex transmission link and a full duplex system is provided by the transmission of data (B) generated by or originating from computer B from transmission interface 108 to receiver interface 104 of computer A in identical fashion over lines 118, 120, 122 and 126 as above described with reference to lines 112, 114, 116 and 124.

For purpose of description, the operation of only one half-duplex link (for data (A)) will be described, it being understood that the other half-duplex link [for data (B)] operates in identical manner. The receiver portion 110 of computer B performs a bit-by-bit comparison with the complementary data received while sending the received data back to the transmission interface 102 of computer A and, if an error is detected by receiver portion 110, the return data line 116 is set to the state or polarity opposite that expected by the transmission portion 102 of computer A, which condition is detected as error in the transmitter and results in the halting of further data transmission. Thus, an error condition is forced for the remainder of the transfer cycle.

Figure 2:
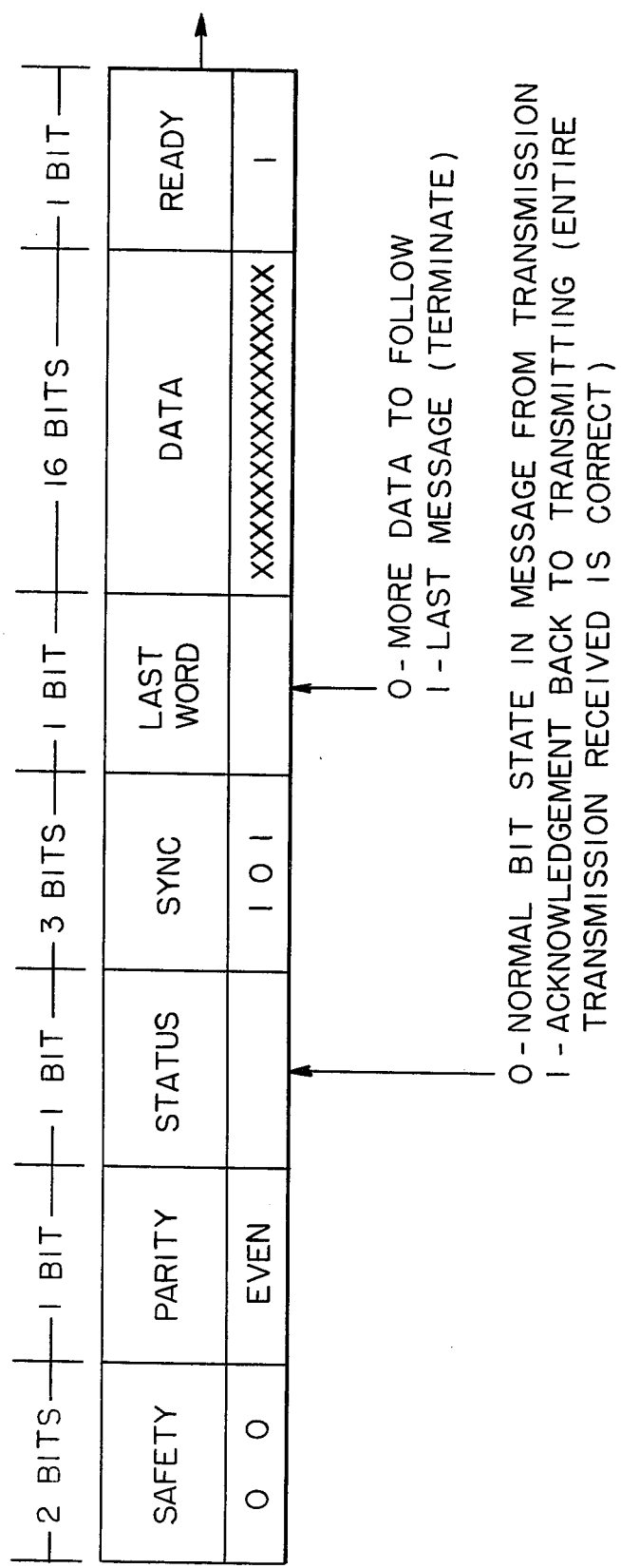
FIG. 2 is a typical processor-to-processor data word format.

A typical 16-bit data character formatted into a 25-bit message is illustrated by FIG. 2. The message is transmitted in the direction illustrated by the arrow with the ready-bit first, followed by the 16-bit data character (least significant bit first), the last word bit, which indicates whether the character is the last word in a message stream, the sync bits, which for the illustrated format are always a logical 101 pattern, the status bit which acknowledges the transmitter that an entire message stream was received correctly, an even parity bit and finally two safety bits added to the end of the message to allow sufficient time for performance of error checking of the transmitted data at both the transmitter and the receiver. This extra two safety bits of processing time is necessary since, as the data is received by the receiving interface, it is returned and sent back to the transmitter for error checking purposes to be described.

The ready bit is always a logical one while the last word bit may be a logical zero if more data is to come and a logical one if the transmitted 16-bits is in fact the last message. The status bit may be a logical zero which is the normal bit state from the transmitter and a logical one for acknowledging correctness of the data transmission.

Operationally, the computer A transmitter logic 102 formulates the data character into the aforementioned 25-bit data message including the ready bit (a logical one). When the ready bit is detected at the receiver interface of computer B, receiver logic 110 accepts the ready bit and conditions the receiver to allow acceptance of the remainder of the message while retransmitting the ready bit back to the transmission interface of computer A. Upon receipt of the returned ready bit, the transmitter logic 102 of computer A proceeds to transmit the remainder of the character message.

As each bit of the data message is transmitted in its normal and complementary state simultaneously on the respective lines 112 and 114 along with the clock on line 124, which clock shifts each data bit into a receiver buffer as it is received, the receiver error logic checks the incoming message as aforedescribed by comparing each bit of the data against each corresponding bit of complementary data. Since the data bits should be opposite, no error signal is generated unless a hardware failure or noise has altered the data. The parity check is performed on incoming data to insure that the correct number of logical one bits have been received in the message. The transmitter portion 102 of computer A also error checks the transmitted data by storing the state of each bit as it is transmitted to computer B over true data line 112 and the comparing that bit to the same data bit as returned from the receiver interface 110 of computer B over the returned data line 116. If the transmitted message is received with no errors detected, the receiver logic 110 generates a data interrupt to indicate that its receiver buffer is full and the data character is on the receive data lines. This procedure is repeated for each data character transmitted until the last character of the message block is transmitted, at which time a terminate signal in the form of a program interrupt is transmitted by the sending processor, in this case, the transmitter logic 102. When the last word bit is detected at the receiver interface, a data interrupt is generated and an end of message status put on the input data lines. When the entire message block has been received correctly, an acknowledgment is issued by the receiving processor B and transmitted to the transmitting processor A. If an acknowledgment is not received within a predetermined time frame of, for example, 10 to 20 milliseconds, a negative acknowledgement is implied and the transmitting processor A retransmits the entire message block. The acknowledge bit provides the software with the means of implementing its own error checking scheme independent of the hardware scheme.

As previously described, the receiving processor B expects the polarity of data on lines 112 and 114 to be opposite; however, in the event that two bits are alike upon comparison at the receiver interface 110 of computer B, the receiver error logic notes the error, inhibits any data interrupts and inverts any remaining data bits in the message placed on the return data line 116, with the effect that the transmission interface 102 of computer A begins receiving returned data bits of the wrong polarity thereby forcing an error condition in its transmitter logic. Such an error condition at the transmitter results in a stopping of the transmission, blocks the generation of a program interrupt and causes a transmission error status to be issued to the processor. The data character in error is then retransmitted to attempt to successively couple the data to the receiving processor. A predetermined number such as seven retries may be made before a different course of action is undertaken by the system software. As is apparent from the above discussion, error checking is on a bit-by-bit basis and error correction is on a word level basis. This method does not require complete or segments of character blocks to be transmitted before correction of errors. This in turn results in a significant processing time savings over systems of the prior art.

Figure 3:
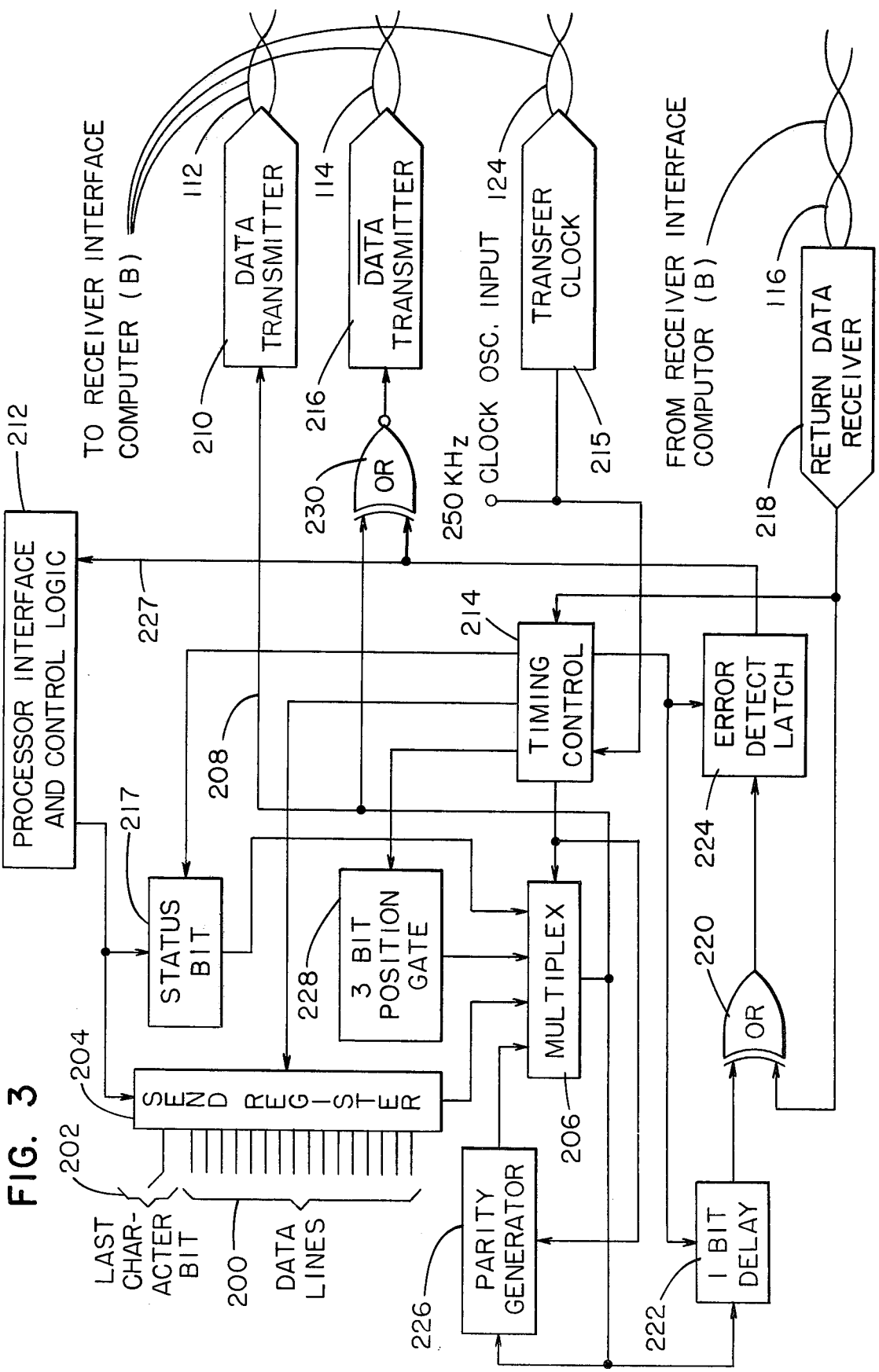
FIG. 3 is a combined block and schematic diagram of a data transmission circuit for coupling data from one data processor to another data processor in accordance with the present invention.
Figure 4:
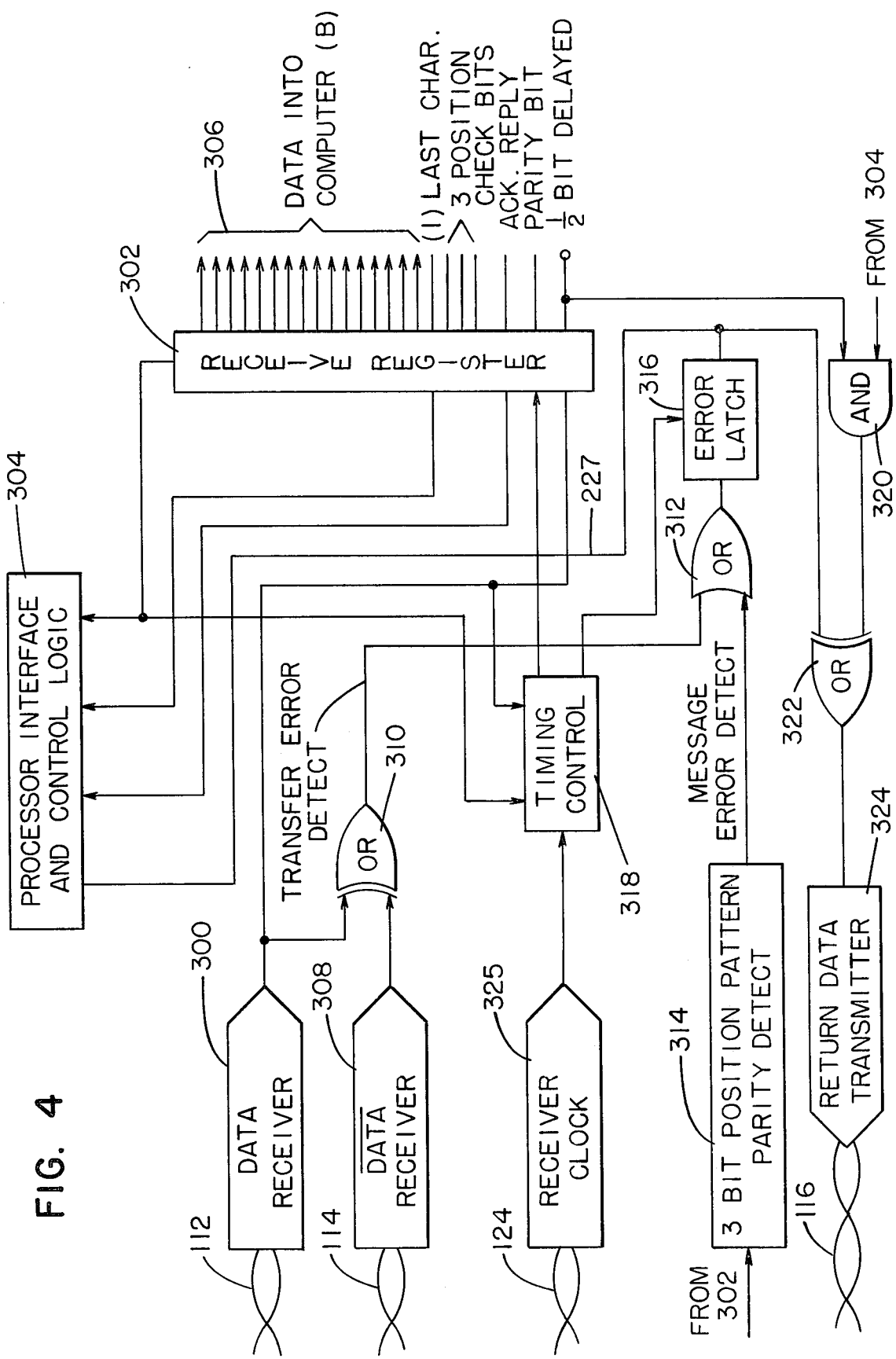
FIG. 4 is a combined block and schematic diagram of a data receiving circuit for receiving data transmitted by the data transmission circuit of FIG. 3.

Referring now to FIG. 3, the transmission logic 102 of computer A is illustrated, which logic is identical to the transmission logic 108 of computer B. Reference is also made to FIG. 4; illustrative of the receiver logic 110 of computer B, which logic is identical to the receiver logic 104 of computer A.

Data from computer A is coupled in parallel over input data lines 200 in the form of 16-bit characters and a "last character bit" is coupled on line 202 to a parallel-to-serial register 204 wherein the data is stored until shifted serially least significant bit first into a transmitter multiplexer 206.

True (non-inverted) data is received at multiplexer 206 and coupled via line 208 to a true data transmitter 210 which couples transmitted data via twisted pair cable 112 to the data receiver of computer B. This serial transfer is controlled by processor interface and control logic 212 which serves together with timing control 214 to clock the send or transmitting register 204. Simultaneously, inverted data is coupled via complementary data transmitter 216 over twisted pair cable 114 to the complementary data receiver of computer B at which computer the true and inverted data are compared as described with reference to FIG. 4.

The error detection circuitry of computer B (FIG. 4) is set to expect the true data and complementary data bits to be of opposite polarity, and when such is the case, incoming true data is coupled from a true data receiver 300 into a serial-to-parallel receiver register 302 under the control of interface and control logic 304 and timing control 318 for computer B. The data is thus transferred internally into computer B via the data lines illustrated at 306. When the true and inverted data bits at receivers 300 and 308 respectively are alike (an error condition) on the true and complementary data lines 112 and 114, the error logic notes the error, inhibits any data, interrupts and inverts the remaining data bits in the message. Error detection occurs at an exclusive OR gate 310 which generates an output in response to any detected error and couples such output to the input of another OR gate 312, at which OR gate 312 the message error detection signal and a 3-bit parity error signal are OR'ed such that the output of OR gate 312 is indicative of either a parity error or a message transmission error, the parity error deriving from a parity detection circuit 314. Under an error condition as aforedescribed, the error latch flip-flop 316, clocked by timing control 318 at the received data rate, is set to the opposite polarity (complementary polarity). The incoming complementary data, delayed by one-half bit, is clocked through AND gate 320 under control of interface logic 304, and forms the return data input at an exclusive OR gate 322, the other input being the output of error latch 316. The output of OR gate 322, indicative of the forced error condition (until corrected by resetting latch 316) causes transmission from transmitters 210 and 216 (FIG. 3) to stop at the end of character time, a program interrupt to be generated and a transmission error status to be issued to computer A. The data character in error is then retransmitted by computer A a predetermined number of times in an attempt to obtain a correct transmission. Additionally, upon detection of the forced error condition at the transmitting computer (computer A), return data receiver 218 causes an error to occur at the receiving computer. The transmission error logic forces the complementary data to match (in polarity) the true data causing an error condition at the receiving computer. Returned data over the twisted pair cable 116 is OR'ed at an exclusive OR gate 220 with the one-bit delayed data prior to transmission via multiplexer 206 and one-bit delay flip-flop (FIG. 3) 222. Thus, exclusive OR gate 220 functions as a comparator, a output of which is sampled by the transmission error detection latch 224, which may comprise a simple JK flip-flop having an output on line 227 coupled to transmission control logic 212 for generation of the transmission inhibit signal and OR'ed with the data prior to transmission to the receiving computer (computer B) by complementary data transmitter 216 at an exclusive OR gate 230, which serves as the forced error transmission means for the remainder of the transfer cycle. The timing controls 214 and 318 provide the necessary function of timing control to each of the logic functions comprised in the transmitter and receiver sections. The same input clock ($250KH_z$) applied to timing control 214 also serves as the data transfer and receiver clocks 215 and 325 respectively and in turn is used by the timing control 318. The interrupt conditions may comprise:

A. transmitter data interrupt — when the transmitter has sent a data character which was not the last character to be sent and no error was detected on the transmission.

B. transmitter program interrupt — when the data character was the last word to be sent or an error condition was detected.

C. receiver data interrupt — when the receiver detects that it has received a complete data character with no error.

D. receiver program interrupt — when the data character has the last word bit set (after a receiver data interrupt).

The aforedescribed error detect latch 224 and data delay flip-flop 222 (FIG. 3) enable the state of the presently transmitted bit, as each bit is transmitted, to be stored at delay 222. This compensates for the delay produced in the receiver logic when the same bit is returned to the transmitter via the return data line 116. If the return data bit at exclusive OR gate 220 and the output of delay 222 are not of the same polarity, error latch 224 is set, causing further data transmission on the complementary data line 114 to be of the same polarity as data on line 112, i.e. the forced error condition.

At both receiver and transmitter logic, transmission error as aforedescribed is checked, with parity generator 226 at the transmitter and detector 314 at the receiver performing the parity check. Sync error is also checked at the receiver logic by the three bit position pattern detector 314, which is illustrated with parity detection. The sync detection (three bits as illustrated by FIG. 2) provides an indication of error when receive register 302 is full, but the message is incorrectly loaded-out of sync one more or one less shifts than should be. The status bit register 217 provides the status bit under software control to convey results of software error checking.

Processor interface and control logic 304 (FIG. 3) and 212 (FIG. 4) include software controlled conditioning logic and interrupt control logic. Both processors are in complete control of the state of its own inter-data processor communication interface, i.e., transmit, receive, and idle modes. Furthermore, processor interface controls 304 and 212 contain the necessary logic to exercise an I/O inturrupt to the respective parent processor.

Receivers 300, 308, 325 and 218 preferably comprise optical couplers of less than unity gain such as part No. HP4351 of Hewlett Packard. Transmitters 210, 216, 215 and 324 preferably are single stage emitter followers which function as transistor switches and as current sources for transmission of nonsymmetrical waveforms, with symmetry being regained at the receiver side. Both sides of the data transfer system (transmitter and receiver) have an equal capability to detect and correct transmitted errors, detected bit-by-bit and corrected character-by-character by the above-described double data transfer technique. The use of optical couplers provide electrical isolation between the respective processors. As is also apparent, the described error detection and correction technique is particularly desirable in communication systems wherein the number of characters per data block is variable, since the described detection and correction techniques are independent of block length and transfer rate.

While the invention has been shown and described with reference to a preferred embodiment thereof, it will be understood that persons skilled in the art may make modifications thereof without departing from the spirit and scope of the invention as defined by the claims appended hereto.

What is claimed is:

1. A method for detecting data transmission errors when data is transferred from a first data processing means to a second data processing means, comprising the steps of:
   transmitting said data on a first line serially bit-by-bit from said first data processing means to said second data processing means;
   inverting said data bit-by-bit prior to transmission;
   transmitting said inverted data simultaneously with said data, bit-by-bit on a second line as complementary data to said second data processing means;
   comparing the polarity of said data and said inverted data, bit-by-bit at said second data processing means; and
   generating an error condition at said first data processing means by returning data thereto from said second data processing means inverted from that as transmitted when said compared data and inverted data are of like polarity.

2. A method in accordance with claim 1, further including the steps of:
   delaying in said first data processing means said data as transmitted to said second data processing means at least one bit time;
   retransmittng said data as received by said second data processing means back to said first data processing means;
   comparing said data as retransmitted with the data as delayed to determine the relative polarity thereof; and
   deriving an error signal at said first data processing means when said delayed data and retransmitted data are of like polarity.

3. A method in accordance with claim 2 further including the step of:
   inverting the polarity of said retransmitted data when said compared data and inverted data are of like polarity at said second data processing means such that said error condition generated at said first data processing means is present until the error condition is corrected, and at least for a data character transfer time.

4. A method in accordance with claim 3 further including the step of:
   inhibiting processing of said data until each compared bit of said transmitted data and said complementary data in the word having an error condition are of complementary polarity.

5. A method in accordance with claim 4 further including the steps of:
   inhibiting processing of said data at the conclusion of transmission of the data word within a partially transmitted block of data words within which word an error was detected; and
   retransmitting said data word a predetermined number of times or until said error condition is corrected.

6. A data communication system comprising: first and second data processing means;
   means for retransmitting data serially from said first data processing means to said second data processing means;
   means for simultaneously transmitting complementary data serially from said first data processing means to said second data processing means; and
   error detection means associated with said second data processing means for comparing bit-by-bit said data and said complementary data, including means for retransmitting said data bit-by-bit from said second data processing means back to said first data processing means at a polarity like or inverted from that transmitted as dictated by the comparison of said data and the complementary data.

7. A data communication system in accordance with claim 6, further comprising:
   means responsive to retransmitted data inverted in polarity for inhibiting processing of said data by said second data processing means until said inversion in polarity ceases to be present.

8. A data communication system in accordance with claim 6, further comprising:
   means for delaying at least one bit time in said first data processing means said data as transmitted to said second data processing means;
   means for comparing the polarity of said retransmitted data and said delayed data bit-by-bit, and having an output; and
   means associated with said first data processing means for deriving an error signal when said output is indicative of a condition of like polarity of the compared signals.

9. A data communication system in accordance with claim 8, further comprising:
   means for inverting the polarity of at least the entire remainder of the retransmitted data word when an error is indicated present in any bit of said data word.

10. A data communication system in accordance with claim 6 wherein said data, said complementary data and said retransmitted data are transmitted over twisted pair lines; and optical coupler means is associated with each of said twisted pair lines for electrically isolating said first data processing means from said second data processing means.

11. A data communication system in accordance with claim 9, further comprising:
means for inhibiting processing of data at the conclusion of transmission of the data word within which an error signal was generated.

12. A data communication system in accordance with claim 11, further comprising:
means for retransmitting said data word having a detected error therein a predetermined number of times or until said error signal is no longer derived.

13. A data communication system in accordance with claim 8 wherein said error detection means associated with said first and second data processing means comprise exclusive OR gates.

14. A data communication system in accordance with claim 13 wherein said data transmitting means includes parallel-to-serial conversion means for converting parallel data words to serial data words.

15. In combination:
a first data processor including means for operating upon digital information therein to derive a complementary digital information signal;
means for serially transmitting said digital information over a first wire line;
means for serially transmitting said complementary digital information over a second wire line;
a second data processor adapted to receive said digital information and complementary digital information and including means for comparing same and for generating an output error signal when the polarities of said compared information are alike;
retransmission means at said second data processor responsive to said error signal for retransmitting said digital information to said first data processor;
transmission error detection means having an output at said first data processor for detecting said retransmitted signal and comparing it to said original digital information delayed such that said comparison is bit-by-bit for corresponding transmitted and retransmitted bits; and
means responsive to said output for inverting data transmitted from said first data processing means, thereby forcing an error condition for the remainder of the transfer cycle.

16. A combination in accordance with claim 15, further comprising:
means for retransmitting said digital information having an error therein a predetermined number of times or until said error condition is no longer present.

* * * * *